Patented May 3, 1938

2,115,892

UNITED STATES PATENT OFFICE 2,115,892

PREPARATION OF HEXOIC ACIDS

Walter J. Toussaint, Charleston, W. Va., assignor by mesne assignments, to Union Carbide and Carbon Corporation, a corporation of New York No Drawing. Application September 18, 1936, Serial No. 101,412

15 Claims. (Cl. 260—116)

The invention relates to the preparation of carboxylic acids containing six carbon atoms, including normal hexoic acid, and in particular those of branched chain structure represented by 2-ethylbutyric acid and 2-methylpentoic acid. It is especially concerned with the production of such acids by oxidation of their corresponding aldehydes in the presence of a catalyst material novel to this type of reaction.

Aldehydes have been known to be quite readily convertible by oxidation to carboxylic acids of corresponding carbon atom content, and this type of reaction forms the basis for synthesis of many organic acids. Oxidation has been conducted in the liquid phase with pure oxygen or air as the oxidizing agent, and normally a catalyst is employed. Among the catalyst materials heretofore used, manganese salts and compounds are probably the most popular, and these have been generally considered quite satisfactory in promoting this type of reaction. Serious difficulties have, however, been encountered with manganese and other known catalytic materials, since there is invariably obtained a yellow-colored product, which must be subjected to severe and involved purification treatment to free the acid from colored impurities. In the preparation of the higher carboxylic acids from the aldehydes these difficulties are further exaggerated, and hexoic acid products formed in the presence of a manganese catalyst are not only colored and impure but the yields obtained are very poor.

It is an object of the present invention to provide improvements in the preparation of the higher carboxylic acids, in particular the normal and branched chain hexoic acids, by an aldehyde oxidation reaction, which will avoid the above-mentioned difficulties, and produce more efficient yields of the acid in a form requiring no subsequent purification treatment.

I have found that copper exerts an excellent catalytic effect on the oxidation of aldehydes, such as normal hexaldehyde, 2-ethylbutyraldehyde and 2-methylpentaldehyde, and will promote a readily controlled oxidation to a very pure form of the corresponding carboxylic acid. Tars and highly colored by-product impurities, heretofore exceedingly difficult to avoid in reactions of this sort, are almost entirely eliminated, and improved yields of a water-white product are obtained, of a purity without subsequent treatment desirable for all normal uses of the acid. In conducting the reaction, operating conditions do not vary greatly from those heretofore employed with other catalyst materials, and the invention is therefore readily adaptable to existing apparatus and procedure.

Numerous experiments have been made to evaluate the advantages of this copper catalyst, from which the following examples are given, as representative of the present invention, and the improvements therein over analogous reactions in the presence of a manganese salt catalyst.

Example 1

A charge of dry 2-ethylbutyraldehyde, containing 0.3% of copper acetate, was placed in a reaction tube fitted with an artificial filter stone diffuser and a brine cooled reflux condenser. Oxygen was diffused into and through the dried aldehyde until absorption had ceased. The temperature of the reaction, which is exothermic in nature, was maintained within 40° to 50° C. A single distillation of the crude reaction product yielded a substantially water-white and pure 2-ethylbutyric acid, with an efficiency, as calculated from the distillation data, of 80%.

Example 2

In substantially the same manner as Example 1, 2-methylpentaldehyde was reacted in a substantially dry state by diffusion of oxygen. In this reaction the temperature was held between 35° and 40° C., and distillation of the reaction product produced excellent yield of very pure 2-methylpentoic acid, with an efficiency in the reaction of about 86%.

Example 3

Employing similar apparatus to that above described, oxygen was diffused through normal hexaldehyde containing 0.6% copper acetate. The temperature was maintained at about 35° C. until oxidation of the aldehyde had been completed. Distillation of the reaction product yielded substantially colorless and pure normal hexoic acid with about 86% efficiency.

Example 4

Similar experiments to each of the above examples were conducted using manganese acetate as the catalyst material. In all instances the acid obtained by a single distillation of the reaction product was by comparison very impure and of a deep yellow color. Chemical treatment and a second distillation were necessary to obtain a quality satisfactory for normal usage of the acid.

As illustrated by the above examples, the invention is readily applicable to the preparation of any of the hexoic acids, but particular advantages are afforded in the forming of those of branched chain structure in this manner, since the latter compounds have been especially difficult to produce in pure form by prior known processes. The Example 4 emphasizes the advantages of my catalyst over the best of those heretofore used in this type of reaction.

It will be understood that, although I refer to copper as the catalyst material, it is present in the reaction mixture in a soluble form. Since copper acetate is readily dissolved, this salt is well adapted as an initial catalyst material, but copper powder, cuprous oxide, cupric oxide, copper hexoate, or other soluble salt of copper may be equally suitable. Regardless of the form in which the copper is originally introduced, it is no doubt largely converted to a hexoate salt during the progress of the reaction, and it is quite likely this material that actually serves as the active catalyst.

Modification in the conditions specified by the examples may be made within the scope of the invention. The reaction proceeds satisfactorily, for example, with the aldehyde initially either dry or water saturated, and air or pure oxygen may serve as the oxidizing agent. Certain variations in temperature may be desirable, but I have found that by controlling the reaction so as to maintain a temperature not substantially higher than 50° C., there is less tendency toward by-product formation with improved quality in the essential product. Normal or superatmospheric pressure may be employed.

This application contains subject matter in common with my copending application Ser. No. 23,027, filed May 23, 1935.

I claim:

1. A process for preparing hexoic acids, which comprises oxidizing a hexaldehyde in the presence of a soluble compound of copper as the sole catalyst material.

2. A process for preparing hexoic acids, which comprises oxidizing a hexaldehyde in the presence of a soluble compound of copper as the sole catalyst material, while maintaining the reaction temperature at a maximum of about 50° C.

3. A process for preparing hexoic acids, which comprises oxidizing a hexaldehyde in the pesence of a soluble copper catalyst initially consisting of copper acetate, while maintaining the reaction temperature at a maximum of about 50° C.

4. A process for preparing hexoic acids of branched-chain structure, which comprises oxidizing a corresponding aldehyde in the presence of a soluble compound of copper as the sole catalyst material.

5. A process for preparing hexoic acids of branched-chain structure, which comprises oxidizing a corresponding aldehyde in the presence of a soluble copper catalyst initially consisting of copper acetate.

6. A process for preparing hexoic acids of branched-chain structure, which comprises oxidizing a corresponding aldehyde in the presence of a soluble copper catalyst initially consisting of copper acetate, while maintaining the reaction temperature between about 35° C. and about 50° C.

7. A process for preparing normal hexoic acid, which comprises oxidizing normal hexaldehyde in the liquid phase, in the presence of a soluble compound of copper as the sole catalyst material.

8. A process for preparing normal hexoic acid, which comprises oxidizing normal hexaldehyde in the liquid phase, in the presence of a soluble copper catalyst initially consisting of copper acetate.

9. A process for preparing normal hexoic acid, which comprises oxidizing normal hexaldehyde in the liquid phase, in the presence of a soluble copper catalyst initially consisting of copper acetate, while maintaining the reaction temperature between about 35° C. and 50° C.

10. A process for preparing 2-ethylbutyric acid, which comprises oxidizing 2-ethylbutyraldehyde in the liquid phase, in the presence of a soluble compound of copper as the sole catalyst material.

11. A process for preparing 2-ethylbutyric acid, which comprises oxidizing 2-ethylbutyraldehyde in the liquid phase, in the presence of a soluble copper catalyst initially consisting of copper acetate.

12. A process for preparing 2-ethylbutyric acid, which comprises oxidizing 2-ethylbutyraldehyde in the liquid phase, in the presence of a soluble copper catalyst initially consisting of copper acetate, while maintaining the reaction temperature between about 35° C. and 50° C.

13. A process for preparing 2-methylpentoic acid, which comprises oxidizing 2-methylpentaldehyde in the liquid phase, in the presence of a soluble compound of copper as the sole catalyst material.

14. A process for preparing 2-methylpentoic acid, which comprises oxidizing 2-methylpentaldehyde in the liquid phase, in the presence of a soluble copper catalyst initially consisting of copper acetate.

15. A process for preparing 2-methylpentoic acid, which comprises oxidizing 2-methylpentaldehyde in the liquid phase, in the presence of a soluble copper catalyst initially consisting of copper acetate, while maintaining the reaction temperature between about 35° C. and 50° C.

WALTER J. TOUSSAINT.